United States Patent
Brunelle et al.

(10) Patent No.: US 6,828,410 B2
(45) Date of Patent: Dec. 7, 2004

(54) METHOD FOR PREPARING POLY(CYCLOHEXANE-1,4-DICARBOXYLATE)S FROM CYCLOHEXANE-1,4-DICARBOXYLIC ACID, AND COMPOSITION

(75) Inventors: Daniel Joseph Brunelle, Burnt Hills, NY (US); Corrado Berti, Lugo (IT); Annamaria Celli, Forlt (IT); Martino Colonna, Bologna (IT); Maurizio Fiorini, Anzola Ehilia (IT); Elisabetta Marianucci, Bologna (IT); Massimo Messori, Modena (IT); Francesco Pilati, Bologna (IT); Laura Sisti, Bologna (IT); Paola Marchese, Bologna (IT)

(73) Assignee: General Electric Company, Niskayuna, NY (US)

( * ) Notice: Subject to any disclaimer, the term of this patent is extended or adjusted under 35 U.S.C. 154(b) by 187 days.

(21) Appl. No.: 10/192,579

(22) Filed: Jul. 10, 2002

(65) Prior Publication Data
US 2003/0232958 A1 Dec. 18, 2003

(51) Int. Cl.⁷ .............................. C08G 63/00
(52) U.S. Cl. .................. 528/271; 525/437; 528/272; 528/279; 528/280; 528/281
(58) Field of Search .................. 525/437; 528/271, 528/272, 279, 280, 281

(56) References Cited

U.S. PATENT DOCUMENTS

| | | |
|---|---|---|
| 2,891,930 A | 6/1959 | Caldwell et al. |
| 2,901,466 A | 8/1959 | Kibler et al. |
| 5,097,006 A | 3/1992 | Kapilow et al. |
| 5,399,661 A | 3/1995 | Borman |
| 5,439,988 A | 8/1995 | Moens et al. |
| 5,486,562 A | 1/1996 | Borman et al. |
| 6,084,055 A | 7/2000 | Brunelle et al. |
| 6,455,664 B1 * | 9/2002 | Patel et al. ............ 528/272 |

* cited by examiner

*Primary Examiner*—Terressa Boykin
(74) *Attorney, Agent, or Firm*—Andrew J. Caruso; Patrick K. Patnode

(57) ABSTRACT

Poly(1,4-cyclohexanedicarboxylate)s, especially poly(1,4-cyclohexanedimethylene-1,4-cyclohexanedicarboxylate), are prepared from at least one relatively non-volatile diol, such as 1,4-cyclohexanedimethanol, and cyclohexane-1,4-dicarboxylic acid by an esterification process in the presence of a catalyst, at a maximum temperature of about 260°. In one embodiment the procedure employs a two-step process, the second of which may be performed in the melt or in the solid state. A volatile diol such as ethylene glycol may also be present.

66 Claims, No Drawings

METHOD FOR PREPARING POLY(CYCLOHEXANE-1,4-DICARBOXYLATE)S FROM CYCLOHEXANE-1,4-DICARBOXYLIC ACID, AND COMPOSITION

BACKGROUND OF THE INVENTION

This invention relates to the preparation of polyesters, and more particularly to the preparation of poly(1,4-cyclohexanedicarboxylate)s.

Poly(1,4-cyclohexanedicarboxylate)s such as poly(1,4-cyclohexanedimethylene-1,4-cyclohexanedicarboxylate), hereinafter sometimes designated "PCCD" for brevity, are known polyesters; reference is made, for example, to U.S. Pat. No. 2,891,930. PCCD is characterized by such advantageous properties as crystallinity and resistance to weathering under conditions of exposure to ultraviolet radiation. These properties have increased interest in commercialization in recent years.

Commercially employed methods of producing PCCD utilize as reactants at least one relatively non-volatile diol, most often 1,4-cyclohexanedimethanol (hereinafter "CHDM") and at least one dialkyl 1,4-cyclohexanedicarboxylate, most often dimethyl 1,4-cyclohexanedicarboxylate (hereinafter "DMCD"). Polymer formation proceeds with the initial formation of oligomers containing ester and hydroxy end-groups, which react together to build molecular weight. The intermediate mixtures of diester, diol and oligomers are miscible in all proportions, forming a clear melt at an early stage of the polymerization reaction. U.S. Pat. No. 6,084,055 is an example of such transesterification procedures.

The DMCD used in this process is ordinarily obtained by reduction of dimethyl terephthalate. Its production, therefore, requires two steps: esterification of terephthalic acid and reduction to form DMCD. It would be desirable to employ cyclohexane-1,4-dicarboxylic acid (hereinafter "CHDA"), which can be obtained in one step by reduction of terephthalic acid, as a reactant in the preparation of PCCD.

The employment of CHDA is not as easy, however, with relatively non-volatile diols such as CHDM as with more volatile ones such as ethylene glycol and 1,4-butanediol. Such volatile diols can be used in excess, driving the esterification to completion, and the excess can then be removed by distillation. Any excess of relatively non-volatile CHDM will, by contrast, remain in the polyester as a contaminant, rendering the polyester useless or at least materially degrading its properties. Another common issue with employing non-volatile CHDM in excess is that the molecular weight of the resulting polyester is limited. Moreover, mixtures of CHDM, CHDA and polyester oligomers are not uniformly miscible since CHDA is not highly soluble in CHDM.

Thus, those attempting to prepare PCCD from CHDM and CHDA find themselves on the horns of a dilemma. If they attempt to employ a large excess of CHDM to maximize the molecular weight of the product, they obtain a polyester that may be essentially useless, for example owing to its contamination with excess CHDM. If, on the other hand, they attempt to employ the reagents in essentially or nearly equimolar proportions, molecular weight control may be a problem since production of high molecular weight polyester requires very close and consistent stoichiometry matching of reactants.

Various factors can affect the crystallinity of PCCD and similar polyesters. One of the major ones is the cis/trans isomer ratio of the diester moiety, especially the acid-derived moieties therein. CHDM and CHDA exist in cis and trans isomeric forms, and the degree of crystallinity of the polymer decreases significantly with an increase in proportion of cis isomer content. For the most part, the reagents DMCD and CHDA have a trans isomer level of 99% by weight or greater. (CHDM is about 70% trans but no isomerization of the diol moieties occurs during polymerization.) The proportion of trans isomer in the polyester itself is lower, in one embodiment about 87% or greater for optimum crystallinity.

Therefore, a method of making high molecular weight, highly crystalline poly(1,4-cyclohexanedicarboxylate)s in essentially contaminant-free form is desirable. In a particular embodiment a method of making high molecular weight, highly crystalline poly(1,4-cyclohexanedicarboxylate)s substantially free from cyclohexane-1,4-dicarboxylic acids is desirable. Such a method is provided by the present invention.

SUMMARY OF THE INVENTION

The present invention is based on the discovery that mixtures of diols comprising CHDM with CHDA and oligomers thereof, may be employed to make high molecular weight polyesters under suitable conditions wherein, as the polymerization proceeds and CHDA becomes incorporated into the polymer, a clear melt is formed. This can be accomplished without resorting to temperatures so high as to cause conversion in the monomers or polymer product of the trans to the cis isomer.

The invention, therefore, is in one embodiment a method for preparing a poly(1,4-cyclohexanedicarboxylate) which comprises bringing into mutual contact, in the presence of an esterification catalyst, reagents comprising at least one relatively non-volatile diol and cyclohexane-1,4-dicarboxylic acid, the molar ratio of total diol to acid being in the range of 0.97–1.02:1, said contact taking place at a temperature in the range of 220–260° C.

DETAILED DESCRIPTION

The polyesters produced by the method of this invention are poly(cyclohexane-1,4-dicarboxylate)s, characterized by the presence of structural units of the formula

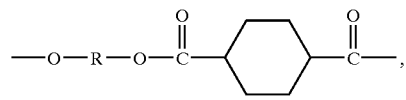

wherein R is an alkyl radical derived from a relatively non-volatile diol HO—R—OH. It is most often a homopolyester, but as noted hereinafter, it may also be a copolyester.

CHDA as employed in the method of this invention is a known compound. In one embodiment of the invention, it undergoes an esterification reaction with at least one relatively non-volatile diol. Within the context of the present invention "relatively non-volatile" diols are those having a boiling point (at atmospheric pressure) in one embodiment at or above about 210° C., in another embodiment above about 220° C., in another embodiment above about 240° C., and in still another embodiment above about 260° C. In particular embodiments the relatively non-volatile diol or mixture of relatively non-volatile diols has a boiling point at atmospheric pressure of above about 250° C. In another particular embodiment the relatively non-volatile diol or mixture of relatively non-volatile diols has a boiling point at atmospheric pressure of greater than the highest temperature at which the esterification reaction is performed. Suitable diols are known in the art and include, but are not limited to, CHDM, benzenedimethanol, adamantanediol, and tetramethylcyclobutanediol. For the sake of convenience, the invention will frequently be described herein with reference to CHDM as the diol; however, it should be understood that other relatively non-volatile diols may be substituted therefor as appropriate.

The transesterification reaction is conducted in the presence of a suitable catalyst. Suitable catalysts for transesterification are well-known in the art and include organometallic compounds containing at least one metal selected from the group consisting of titanium, zirconium, tin, antimony, germanium, gallium, zinc, iron, manganese, cobalt, hafnium, vanadium, iridium, lanthanum, cerium, lithium, calcium, magnesium, barium, nickel, and aluminum. Only one kind of the above-listed catalysts may be employed, or two or more kinds thereof may be suitably mixed and employed. In various embodiments the catalyst is a tetraalkyl titanate such as tetraisopropyl titanate, tetra-n-butyltitanate, and tetrakis(2-ethylhexyl) orthotitanate. In other embodiments suitable catalysts include organotin compounds such as dibutyltin oxide, stannous 2-ethylhexanoate and stannic oxide, and antimony compounds such as antimony(III) oxide and mixtures thereof with calcium acetate. Catalyst amounts are those effective for esterification. Catalyst amounts are in some embodiments in the range of about 20–500 ppm metal, in other embodiments in the range of about 50–320 ppm metal, in still other embodiments in the range of about 100–250 ppm metal, and in still other embodiments in the range of about 100–200 ppm metal based on theoretical polymer yield. All of the catalyst may be present at the beginning of the reaction. In other embodiments it may be advantageous to introduce the catalyst in stages, with up to about 50% thereof being present at the initiation of the transesterification reaction and the balance being added subsequently, most often after about 30–50% of the total reaction time. The catalyst may be introduced into the reaction mixture by any means known in the art. Often it is convenient to add the catalyst either neat or as a solution in an inert solvent.

Solvents and diluents may be used in the polymerization reaction but are not necessary. In a particular embodiment of the invention solvents and diluents are not present in the polymerization reaction. In some embodiments of the invention subatmospheric reaction pressures may be employed.

It is within the scope of the invention for the poly(1,4-cyclohexanedicarboxylate) to be a copolyester of a type incorporating "soft-blocks" derived from polyethers. This may be done by incorporating in the reaction mixture at least one relatively non-volatile bis(hydroxy-terminated) polyether such as, but not limited to, poly(ethylene glycol), poly(propylene glycol), poly(butylene glycol) and their copolymers such as bis(hydroxy-terminated) poly(ethylene oxide-co-propylene oxide). In some particular embodiments the copolyester consists essentially of diol units derived from 1,4-cyclohexanedimethanol and diol units derived from at least one relatively non-volatile bis(hydroxy-terminated) polyether.

It is further within the scope of the invention for the poly(1,4-cyclohexanedicarboxylate) to be a copolyesteramide of a type incorporating "soft-blocks" derived from relatively non-volatile bis(amine-terminated) polyethers. This may be done by incorporating in the reaction mixture at least one bis(amine-terminated)-polyalkylene oxide, such as, but not limited to, bis(amine-terminated)-polyethylene oxide, -polypropylene oxide, -polybutylene oxide, and their copolymers such as bis(amine-terminated) poly(ethylene oxide-co-propylene oxide). In some particular embodiments the copolyesteramide consists essentially of diol units derived from 1,4-cyclohexanedimethanol and diamine units derived from at least one relatively non-volatile bis(amine-terminated) polyether.

Because of the possible thermal instability of bis (hydroxy-terminated)- or bis(amine-terminated)-polyethers, it is often advantageous to incorporate at least one thermal stabilizer into the reaction mixture containing at least one of said polyethers. In various embodiments thermal stabilizers are non-reactive stabilizers including those which will not themselves undergo reaction with the poly(1,4-cyclohexanedicarboxylate) product. In particular embodiments thermal stabilizers include 1,3,5-trimethyl-2,4,6-tris (3,5-di-tert-butyl-4-hydroxybenzyl)benzene. A sufficient amount of stabilizer is used to prevent significant degradation of said polyether and polyether-containing copolyester under the reaction conditions. In some embodiments 0.1–2.0 wt. % stabilizer and in other embodiments 0.2–1.0 wt. % stabilizer based on polyether is employed.

In various embodiments of the invention the molar ratio of total diol to acid in the esterification reaction mixture is in one embodiment in the range of about 0.97–1.02:1; in another embodiment in the range of about 0.97–1.01:1; and in another embodiment in the range of about 1.0–1.01:1. The term "total diol" is employed by reason of the possibility of using a mixture of relatively non-volatile and volatile diols, as explained hereinafter. In a particular embodiment the molar ratio of total diol to acid in the esterification reaction mixture is in the range of 1.0–1.005:1.

The details of the esterification reaction, other than molar ratio of diol to acid and maximum temperature, are not critical. In some embodiments the reaction is conducted in two steps. The first step is conducted in the melt at a temperature of at least about 220° C., since it has been discovered that while mixtures of CHDM and CHDA are not all miscible at lower temperatures, they are miscible at 220° C. and above, making such temperatures beneficial for esterification. In a particular embodiment the temperature for the first step is in the range of about 220–230° C. and the reaction is conducted, at least initially, at atmospheric pressure.

The second or molecular weight building step of the esterification reaction is in one embodiment at a maximum temperature of about 260° C., and in another embodiment at a maximum temperature of about 250° C. Subatmospheric pressures, in various embodiments in the range of about 0.1–10.0 mbar, may be employed for at least part of this second step. It is also contemplated to begin the second step at a lower temperature and increase the temperature either gradually or stepwise to the maximum value.

Different embodiments of the invention, based on the state of the reaction mixture during the molecular weight building step, are possible. In the first of these embodiments, said step is conducted in the melt at a temperature in the range in one embodiment of 230–260° C., and in another embodiment of 230–250° C. In the second embodiment, the molecular weight building step is conducted in the solid state in one embodiment at a maximum temperature of about 235° C., in another embodiment at a maximum temperature of about 230° C., in another embodiment at a maximum temperature of about 225° C., and in another embodiment at a maximum temperature of about 220° C. In some embodiments the temperature range for solid state polymerization is about 205–235° C., and in other embodiments the temperature range is about 205–220° C. The solid state reaction is in various embodiments performed under a flow of an inert gas such as nitrogen or argon at a rate effective to remove volatile by-products, typically about 1–2 liters per minute (1/min). It is often found that polymerization partially in the solid state affords a polymer with a greater degree of crystallinity, and less tendency to isomerize from the trans to the cis isomer, than polymerization entirely in the melt. In one particular embodiment no isomerization of trans to cis isomer in carboxylate structural units is found when the molecular weight building step is perfomed in the solid state. In some embodiments polymers prepared by a solid state polymerization process may have higher % trans isomer content than similar polymers prepared in a melt process. In particular embodiments polymers prepared by a solid state polymerization process have trans isomer content greater than about 90%, in another embodiment greater than about 91%, in another embodiment greater than about 92%, in another embodiment in a range of between about 90% and about 95%, in still another embodiment in a range of between about 91% and about 94%, and in still another embodiment in a range of between about 92% and about 93%.

In a further embodiment of the invention, the initial stage of the esterification reaction is conducted in the presence of at least one volatile aliphatic diol, typically a $C_{2-6}$ diol. The volatile aliphatic diol has a boiling point at atmospheric pressure less than the boiling point at atmospheric pressure of the relatively non-volatile diol or mixture of relatively non-volatile diols. Suitable volatile diols include ethylene glycol, diethylene glycol and 1,4-butanediol. The volatile diol is normally introduced at the beginning of the reaction, most often in the amount of 1–5 mole percent based on total diol.

In the early stages of the reaction the aliphatic diol apparently participates actively, to form an aliphatic diol-terminated oligomer which, in later stages, polycondenses with elimination of the diol to form high molecular weight PCCD. It is also believed that any imbalance in stoichiometry of the product polyester, by reason of the differences in volatility between the polyester-forming reagents, may be rectified by the inclusion of structural units derived from the volatile diol. Results may include the attainment of a higher molecular weight and the maintenance of a higher level of trans isomer than in the absence of volatile diol.

In another embodiment the invention may encompass the inclusion in the esterification reaction mixture of at least one branching agent such as a trifunctional or higher functional carboxylic acid and/or trifunctional or higher functional alcohol. Such branching agents, if included, can preferably be used in quantities of 0.005 to 1 mole %, based on dicarboxylic acid or diol moieties used, respectively. Suitable branching agents include, for example, trifunctional or higher carboxylic acids, such as trimesic acid, cyanuric acid, 3,3',4,4'-benzophenone tetracarboxylic acid, 1,4,5,8-naphthalene tetracarboxylic acid or pyromellitic acid, and trifunctional or higher alcohols, such as, but not limited to, pentaerythritol, glycerol, cyclohexanetriol, trisisopropanolamine, trihydroxyhexane, tris (hydroxymethyl)aminomethane, 1,3,5-tris(2-hydroxyethyl)-1,3,5-triazine-2,4,6-(1H,3H,5H)-trione, and 1,1,1-tris (hydroxymethyl)ethane. Alcoholic branching agents may be introduced with the diol moieties whilst acid branching agents may be introduced together with acid moieties.

The poly(1,4-cyclohexanedicarboxylate)s prepared in various embodiments of the invention are characterized by high weight average molecular weights (Mw), in one embodiment above 30,000, in another embodiment above 40,000, in another embodiment above 50,000, and in another embodiment above 60,000, as determined by gel permeation chromatography relative to polystyrene standards, and using refractive index detection. The poly(1,4-cyclohexanedicarboxylate)s are also characterized by relatively high crystallization temperatures (Tc), in one embodiment above 150° and in another embodiment above 160° C.; and relatively high crystalline melting temperatures (Tm), in one embodiment above 210° C.; and high trans isomer content, in one embodiment at least about 84%, in another embodiment at least about 85%, in another embodiment at least about 87%, in another embodiment at least about 90%, in another embodiment in a range of between about 84% and about 92%, in another embodiment in a range of between about 85% and about 91%, and in another embodiment in a range of between about 86% and about 90%. In other embodiments trans isomer content in the poly(1,4-cyclohexanedicarboxylate)s is greater than about 90%, in another embodiment in a range of between about 90% and about 95%, and in still another embodiment in a range of between about 91% and about 94%. In the determination of Tm by differential scanning calorimetry (DSC), it is often found that two different values are obtained in successive trials, the second value being higher than the first, and the above-listed values are for the first heat. It is generally preferred for the Mw, Tc and Tm values all to be as high as possible. In some embodiments it is observed that the polymer may exhibit two Tm values during the second heat.

The poly(1,4-cyclohexanedicarboxylate)s prepared in various embodiments of the invention are also characterized by having a uniquely high concentration of carboxylic acid end-groups compared to poly(1,4-cyclohexanedicarboxylate)s made in the prior art. More particularly, poly(1,4-cyclohexanedicarboxylate)s of the present invention have carboxylic acid end-groups arising from the use of CHDA as a monomer. In some embodiments the concentration of carboxylic acid end-groups on polymers of the invention is in a range of between about 200 ppm and about 8000 ppm, in other embodiments in a range of between about 200 ppm and about in 5000 ppm, in other embodiments in a range of between about 300 ppm and about 4000 ppm, and in still other embodiments in a range of between about 400 ppm and about 4000 ppm. In contrast poly(1,4-cyclohexanedicarboxylate)s made by previously known methods have carboxylic ester groups arising from use of DMCD as a monomer. In general such polymers made by previously known methods using DMCD as a monomer have a carboxylic acid end-group concentration of less than 200 ppm, wherein the acid end-groups may result from processes such as adventitious hydrolysis of ester end-groups or use of partially hydrolyzed starting monomer. Carboxylic acid end-groups on the polymers of the present invention may have beneficial property effects, including but not limited to increased tendency of the polymer to crystallize under certain circumstances.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLE 1

In a series of catalyst screening experiments, a mixture of equimolar amounts of CHDA and CHDM was charged to a glass tube 15×1.5 centimeters (cm), and catalyst was added, dissolved in toluene in runs 2–9 and in water in run 10, in the amount of 200 ppm of metal based on theoretical polymer yield. The catalyst solvent was removed under vacuum and the tube was heated in a silicone oil bath to 200° C. for 30 minutes. The temperature was then raised to 230° C. and the pressure in the tube was reduced to 2 mbar over about 7 minutes. This temperature was maintained for 30 minutes, after which the polymer was recovered. The results are given in Table I.

TABLE I

| Run No. | Catalyst | Mw | Mn |
|---|---|---|---|
| 1 | None | 3,500 | 1,400 |
| 2 | Tetrakis(2-ethylhexyl) orthotitanate | 3,900 | 1,700 |
| 3 | Tetra-n-butyl titanate | 4,400 | 1,900 |
| 4 | Tetra-n-propyl titanate | 4,000 | 1,800 |
| 5 | Di-n-butyltin oxide | 3,900 | 1,500 |
| 6 | Stannous 2-ethylhexanoate | 4,800 | 2,100 |
| 7 | Butyltin hydroxide-oxide | 4,000 | 1,700 |
| 8 | Zirconium (IV) 2,4-pentanedionate | 3,900 | 1,600 |
| 9 | Antimony (III) oxide | 5,500 | 2,300 |
| 10 | Antimony (III) oxide/calcium acetate, 1:1 molar | 5,300 | 2,100 |

It is evident that each of the evaluated catalyst materials had some catalytic effect. However, the product of run 10 was gray in color.

EXAMPLE 2

In a series of runs, a 250 milliliter (ml) round-bottomed, wide-neck glass reactor was charged with about 20 grams (g) of CHDM and predetermined amounts of CHDA and tetra-n-butyl titanate, the latter in the form of a 0.1 N solution in toluene. The reactor was closed with a flat flange equipped with a mechanical stirrer and a torque meter. The lid was heated with a heating band to 100° C. and the system was connected to a liquid nitrogen-cooled condenser and immersed in an oil bath maintained at 220° C. This temperature was maintained without stirring for the first step of the esterification reaction which was performed at atmospheric pressure. After 90 minutes, the temperature was increased to a higher value, the stirrer was started and the pressure was reduced to about 0.2–1.0 mbar over about 15 minutes, after which heating was continued for a total heating time of 60 minutes. In runs where higher temperatures were employed, each 10° increase in temperature was maintained for 60 minutes. The product PCCD was then recovered from the reactor. Each sample was analyzed for Mw, and for Tm and Tc in a first heating and cooling DSC cycle, followed by a second Tm cycle. The DSC measurements were performed under nitrogen by heating through a first cycle from 50° C. to 250° C. at a heating rate of 20° C./minute, then holding at 250° C. for 1 minute, then cooling at 20° C./minute to 50° C. measure Tc; then holding at 50° C. for 1 minute; and then heating through a second cycle from 50° C. to 250° C. at a heating rate of 20° C./minute. Values for % trans isomer were determined by $^{13}$C nuclear magnetic resonance spectroscopy of carbonyl groups. The relevant parameters and results are given in Table II.

TABLE II

| Run | CHDM/ CHDA molar ratio | Catalyst, ppm metal | Final temp., ° C. | Trans isomer, % | Tc, ° C. | Tm, ° C., 2nd heat | Mw |
|---|---|---|---|---|---|---|---|
| 11 | 1.000 | 250.0 | 260 | 85 | 160.3 | 203.2; 214.5 | 27,400 |
| 12 | 1.005 | 175.0 | 250 | 88 | 168.5 | 214.9; 218.6 | 50,200 |
| 13 | 1.013 | 175.0 | 250 | 88 | 169.1 | 212.3; 218.7 | 50,000 |
| 14 | 1.005 | 175.0 | 250 | 89 | 167.5 | 214.6 | 61,200 |
| 15 | 1.010 | 250.0 | 260 | 86 | 163.3 | 214.5 | 55,500 |
| 16 | 1.000 | 100.0 | 240 | 91 | 167.0 | 210.5; 218.9 | 43,400 |
| 17 | 1.005 | 48.9 | 250 | 87 | 171.3 | 206.2; 214.5 | 29,600 |
| 18 | 1.005 | 175.0 | 250 | 88 | 160.3 | 207.5; 216.9 | 49,100 |
| 19 | 1.005 | 175.0 | 267 | 86 | 153.3 | 210.7 | 68,300 |
| 20 | 1.005 | 175.0 | 250 | 88 | 167.5 | 213.7 | 60,000 |
| 21 | 1.005 | 301.1 | 250 | 91 | 165.3 | 216.1 | 70,400 |
| 22 | 1.010 | 100.0 | 260 | 86 | 152.1 | 209.2; 215.9 | 67,100 |
| 23 | 1.000 | 100.0 | 260 | 86 | 158.3 | 211.5 | 80,300 |
| 24 | 0.997 | 175.0 | 250 | 87 | 147.3 | 201.6; 216.7 | 32,400 |
| 25 | 1.005 | 175.0 | 250 | 90 | 163.3 | 215.1 | 66,700 |
| 26 | 1.005 | 175.0 | 250 | 90 | 162.3 | 215.1; 219.8 | 53,500 |
| 27 | 1.005 | 175.0 | 250 | 87 | 164.6 | 213.4; 218.3 | 63,300 |
| 28 | 1.005 | 175.0 | 250 | 85 | 170.2 | 216.3; 221.9 | 54,700 |
| 29 | 1.005 | 175.0 | 250 | 85 | 171.5 | 216.7; 226.5 | 46,800 |
| 30 | 1.005 | 175.0 | 250 | 88 | 165.1 | 215.3 | 63,700 |
| 31 | 1.005 | 175.0 | 250 | 85 | 162.7 | 210.8; 221.7 | 44,700 |

From the results in Table II, it will be apparent that the trends toward high trans isomer content, high crystallization and melting temperatures and high molecular weight are particularly evident in the runs conducted at a maximum temperature of 260° C. and especially 250° C. Moreover, a comparison of run 24 with the other runs shows the advantages of employing a diol:acid molar ratio of at least 1.0:1.

EXAMPLE 3

The procedure of Example 2 was repeated, employing a reagent molar ratio of 1:1 CHDA:CHDM and a catalyst content of 175 ppm metal. In addition, ethylene glycol (EG) was incorporated into the reaction mixture at two different levels based on total diol. The temperature profile was 220° C. (atmospheric pressure) for 90 minutes, followed by applying vacuum and maintaining the temperature at 230° C. for 30 minutes, 240° C. for 60 minutes and 250° C. for 60 minutes. The results are given in Table III. The value for Tm was determined from the second DSC heating cycle.

TABLE III

| Run | EG in reactants, mole % | EG in product, mole % | Trans isomer, % | Tm, ° C. | Tc, ° C. | Mw |
|---|---|---|---|---|---|---|
| 32 | 2.5 | 1.5 | 88 | 214.5 | 158.2 | 81,300 |
| 33 | 5.0 | 2.4 | 89 | 214.9 | 160.9 | 93,800 |

By comparing Tables II and III, it can be seen that runs 32 and 33 which employed ethylene glycol afforded PCCD with higher molecular weight than runs 11–31. Moreover, the levels of trans isomer in runs 32 and 33 were higher than in many of runs 11–31.

EXAMPLE 4

A PCCD prepolymer was prepared as described in Example 2, employing a 1.005:1 molar ratio of CHDM to CHDA and 175 ppm of tetra-n-butyl titanate. The reaction was conducted at atmospheric pressure and 220° C. for 90 minutes at atmospheric pressure without stirring, after which the pressure was decreased to about 0.2–1.0 mbar over about 15 minutes and the temperature was increased to 230° C., where it was maintained for 40 minutes.

The prepolymer (5–10 g) was ground to a fine powder and charged to a cylindrical glass reactor of about 30 millimeter (mm) internal diameter, fitted with a glass frit and thermocouple and having a glass sleeve for gas passage so that the gas was heated to the same temperature as the oil bath. Dry nitrogen was passed at a flow rate of about 1–2 l/min through the sleeve, into the reactor and through the frit, thus contacting the prepolymer. The reactor was immersed in an oil bath maintained at 210° C. (polymerization temperature of 206° C.), with removal and analysis of samples at various times. Each sample was analyzed for Mw and for Tm and Tc in a first heating and cooling DSC cycle, followed by a second heating cycle to redetermine Tm. The results are given in Table IV.

TABLE IV

| Time, hr | Mw | Trans isomer, % | Tm, ° C. 1st cycle | Tc, ° C. | Tm, ° C. 2nd cycle |
|---|---|---|---|---|---|
| 0 | 15,200 | 93 | 226 | 182.3 | 218.5, 232.7 |
| 1 | 33,100 | 93 | 240 | 170.6 | 220.5, 231.3 |
| 2 | 47,200 | 93 | 247 | 165.3 | 220.3, 231.2 |
| 3 | 53,300 | 93 | 248 | 159.9 | 220, 230.1 |
| 4 | 59,200 | 93 | 249 | 157.3 | 220.7, 229.4 |
| 5 | 62,300 | 93 | 249 | 155.3 | 220.7, 228.1 |
| 5.3 | 63,900 | 93 | 249 | 155.9 | 220.7, 228.7 |

It is apparent from Table IV that no isomerization took place during solid state polymerization. Molecular weight, Tm and Tc increase were significant for about the first 3 hours, after which they slowed to an approximately asymptotic progression.

A similar procedure was performed at 220° C. (polymerization temperature 216° C.). A polymer with a slightly higher weight average molecular weight was obtained.

EXAMPLE 5

The procedure of Example 4 was repeated with the addition of EG in the amount of 5 mole percent of total diol. The resulting polymer contained 2.9 mole percent EG units, and the other properties of various samples removed during polymerization are shown in Table V. The value for Tm was determined from the second DSC heating cycle.

TABLE V

| Time, hr | Mw | Trans isomer, % | Tc, ° C. | Tm, ° C. |
|---|---|---|---|---|
| 0 | 20,900 | 93 | — | — |
| 1 | 37,300 | 93 | 159.5 | 207.3, 217.7 |
| 2 | 51,000 | 93 | 151.1 | 207.7, 217.5 |
| 4 | 64,500 | 92 | 145.5 | 207.7, 216.9 |
| 12 | 77,300 | 92 | 134.3 | 205.7, 214.1 |

EXAMPLE 6

The carboxylic acid end-group concentrations of polymers made in embodiments of the present invention were analyzed by derivatization with 1,2-phenylene phosphorochloridite and analysis by $^{31}$P nuclear magnetic resonance spectroscopy. For comparison two samples of PCCD (PCCD-1 and PCCD-2; synthesized using DMCD using methods in U.S. Pat. No. 6,084,055) were analyzed by the same method. The analytical results are shown in Table VI.

TABLE VI

| Sample | Mw | COOH (ppm) | OH (ppm) |
|---|---|---|---|
| PCCD-1 | 75,200 | 100 | 706 |
| PCCD-2 | 76,600 | 79 | 1068 |
| Run 34 | 67,100 | 3856 | 68 |
| Run 35 | 66,700 | 569 | 1162 |
| Run 36 | 55,500 | 3301 | 371 |

It is apparent that the poly(1,4-cyclohexanedicarboxylate)s made by methods of the present invention have higher carboxylic acid end-group concentration than similar polymers made by methods of the prior art.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention. All patents cited herein are incorporated herein by reference.

What is claimed is:

1. A method for preparing a poly(1,4-cyclohexanedicarboxylate) which comprises bringing into mutual contact, in the presence of an esterification catalyst, reagents comprising at least one relatively non-volatile diol and cyclohexane-1,4-dicarboxylic acid, the molar ratio of total diol to acid being in the range of 0.97–1.02:1, said contact taking place at a temperature in the range of 220–260° C.

2. The method according to claim 1 wherein the molar ratio of total diol to acid is in the range of 0.97–1.01:1.

3. The method according to claim 1 wherein the molar ratio of total diol to acid is in the range of 1.0–1.01:1.

4. The method according to claim 1 wherein the molar ratio of total diol to acid is in the range of 1.0–1.005:1.

5. The method according to claim 1 wherein the temperature is in the range of 220–250° C.

6. The method according to claim 1 wherein the relatively non-volatile diol or mixture of relatively non-volatile diols has a boiling point at atmospheric pressure at or above about 210° C.

7. The method according to claim 1 wherein the relatively non-volatile diol or mixture of relatively non-volatile diols has a boiling point at atmospheric pressure of above about 250° C.

8. The method according to claim 1 wherein the relatively non-volatile diol is 1,4-cyclohexanedimethanol.

9. The method according to claim 1 wherein the catalyst comprises at least one organometallic compound containing at least one metal selected from the group consisting of titanium, zirconium, tin, antimony, germanium, gallium, zinc, iron, manganese, cobalt, hafnium, vanadium, iridium, lanthanum, cerium, lithium, calcium, magnesium, barium, nickel, and aluminum.

10. The method according to claim 9 wherein the catalyst is a tetraalkyl titanate.

11. The method according to claim 1 wherein the amount of esterification catalyst is in the range of 20–500 ppm based on theoretical polymer yield.

12. The method according to claim 1 wherein there is also present at least one volatile aliphatic diol in the amount of about 1–10 mole percent based on the combination of total diol.

13. The method according to claim 12 wherein the volatile diol is a $C_{2-6}$ diol.

14. The method according to claim 13 wherein the volatile diol is ethylene glycol.

15. The poly(1,4-cyclohexanedicarboxylate) made by the method of claim 1.

16. The poly(1,4-cyclohexanedicarboxylate) made by the method of claim 12.

17. The poly(1,4-cyclohexanedicarboxylate) made by the method of claim 13.

18. A method for preparing a poly(1,4-cyclohexanedicarboxylate) which comprises bringing into mutual contact, in the presence of an esterification catalyst, reagents comprising at least one relatively non-volatile diol and cyclohexane-1,4-dicarboxylic acid, the molar ratio of total diol to acid being in the range of 0.97–1.02:1, said contact taking place in the melt in two steps at two different temperatures, the temperature of the first step being in the range of about 220–230° C. and the maximum second temperature being 260° C.

19. The method according to claim 18 wherein the molar ratio of total diol to acid is in the range of 0.97–1.01:1.

20. The method according to claim 18 wherein the molar ratio of total diol to acid is in the range of 1.0–1.01:1.

21. The method according to claim 18 wherein the molar ratio of total diol to acid is in the range of 1.0–1.005:1.

22. The method according to claim 18 wherein the maximum second temperature is 250° C.

23. The method according to claim 22 wherein the second step is conducted in the melt at a temperature in the range of about 230–250° C.

24. The method according to claim 18 wherein the relatively non-volatile diol or mixture of relatively non-volatile diols has a boiling point at atmospheric pressure at or above about 210° C.

25. The method according to claim 18 wherein the relatively non-volatile diol or mixture of relatively non-volatile diols has a boiling point at atmospheric pressure of above about 250° C.

26. The method according to claim 18 wherein the relatively non-volatile diol is 1,4-cyclohexanedimethanol.

27. The method according to claim 18 wherein the catalyst comprises at least one organometallic compound containing at least one metal selected from the group consisting of titanium, zirconium, tin, antimony, germanium, gallium, zinc, iron, manganese, cobalt, hafnium, vanadium, iridium, lanthanum, cerium, lithium, calcium, magnesium, barium, nickel, and aluminum.

28. The method according to claim 27 wherein the catalyst is a tetraalkyl titanate.

29. The method according to claim 18 wherein the amount of esterification catalyst is in the range of 20–500 ppm based on theoretical polymer yield.

30. The method according to claim 18 wherein there is also present at least one volatile aliphatic diol in the amount of about 1–10 mole percent based on the combination of total diol.

31. The method according to claim 30 wherein the volatile diol is a $C_{2-6}$ diol.

32. The method according to claim 31 wherein the volatile diol is ethylene glycol.

33. The method according to claim 18 wherein the second step is conducted in the solid state in a flow of an inert gas at a temperature in the range of 205–235° C.

34. The method according to claim 33 wherein the temperature is in the range of 205–220° C.

35. The method according to claim 33 wherein the inert gas is nitrogen.

36. The method according to claim 33 wherein the relatively non-volatile diol is 1,4-cyclohexanedimethanol.

37. The method according to claim 33 wherein there is also present at least one volatile aliphatic diol in the amount of about 1–10 mole percent based on the combination of total diol.

38. The method according to claim 37 wherein the volatile diol is a $C_{2-6}$ diol.

39. The method according to claim 38 wherein the volatile diol is ethylene glycol.

40. The poly(1,4-cyclohexanedicarboxylate) made by the method of claim 18.

41. The poly(1,4-cyclohexanedicarboxylate) made by the method of claim 23.

42. The poly(1,4-cyclohexanedicarboxylate) made by the method of claim 26.

43. The poly(1,4-cyclohexanedicarboxylate) made by the method of claim 30.

44. The poly(1,4-cyclohexanedicarboxylate) made by the method of claim 31.

45. The poly(1,4-cyclohexanedicarboxylate) made by the method of claim 33.

46. The poly(1,4-cyclohexanedicarboxylate) made by the method of claim 36.

47. The poly(1,4-cyclohexanedicarboxylate) of claim 46 having a % trans isomer content of 1,4-cyclohexanedicarboxylate structural units of greater than 90%.

48. The poly(1,4-cyclohexanedicarboxylate) of claim 47 having a % trans isomer content of 1,4-cyclohexanedicarboxylate structural units in a range of between about 91% and about 94%.

49. The poly(1,4-cyclohexanedicarboxylate) made by the method of claim 37.

50. The poly(1,4-cyclohexanedicarboxylate) made by the method of claim 38.

51. The poly(1,4-cyclohexanedicarboxylate) made by the method of claim 39.

52. A method for preparing poly(1,4-cyclohexanedimethylene-1,4-cyclohexanedicarboxylate) which comprises bringing into mutual contact, in the presence of an amount effective for esterification of a tetraalkyl titanate, reagents comprising 1,4-cyclohexanedimethanol and cyclohexane-1,4-dicarboxylic acid, the molar ratio of total diol to acid being in the range of 1.0–1.005:1, said contact taking place in two steps at two different temperatures, the maximum second temperature being 250° C.

53. The method according to claim 52 wherein ethylene glycol is also present in the amount of about 1–10 mole percent based on total diol.

54. The method according to claim 52 wherein the second step is conducted in the melt at a temperature in the range of about 230–250° C.

55. The method according to claim 52 wherein the second step is conducted in the solid state in a flow of nitrogen, at a temperature in the range of 205–220° C.

56. The poly(1,4-cyclohexanedimethylene-1,4-cyclohexane-dicarboxylate) made by the method of claim 52.

57. The poly(1,4-cyclohexanedimethylene-1,4-cyclohexane-dicarboxylate) made by the method of claim 53.

58. The poly(1,4-cyclohexanedimethylene-1,4-cyclohexane-dicarboxylate) made by the method of claim 54.

59. The poly(1,4-cyclohexanedimethylene-1,4-cyclohexane-dicarboxylate) made by the method of claim 55.

60. The poly(1,4-cyclohexanedimethylene-1,4-cyclohexane-dicarboxylate) of claim 59 having a % trans isomer content of 1,4-cyclohexanedicarboxylate structural units of greater than 90%.

61. The poly(1,4-cyclohexanedimethylene-1,4-cyclohexane-dicarboxylate) of claim 60 having a % trans isomer content of 1,4-cyclohexanedicarboxylate structural units in a range of between about 91% and about 94%.

62. A poly(1,4-cyclohexanedicarboxylate) having a carboxylic acid end-group concentration in a range of between about 200 ppm and about 8000 ppm.

63. The poly(1,4-cyclohexanedicarboxylate) of claim 62 having a carboxylic acid end-group concentration in arrange of between about 400 ppm and about 4000 ppm.

64. The poly(1,4-cyclohexanedicarboxylate) of claim 62 comprising structural units derived from 1,4-cyclohexanedimethanol.

65. The poly(1,4-cyclohexanedicarboxylate) of claim 64 further comprising structural units derived from a $C_{2-6}$ diol.

66. The poly(1,4-cyclohexanedicarboxylate) of claim 65 comprising structural units derived from ethylene glycol.

* * * * *